United States Patent [19]

Anderson

[11] Patent Number: 4,901,858
[45] Date of Patent: Feb. 20, 1990

[54] SELF-SUPPORTING DISPLAY BLISTER PACKAGE

[75] Inventor: Jeffrey B. Anderson, Newmarket, Canada

[73] Assignee: Bristol-Myers Canada, Inc., Toronto, Canada

[21] Appl. No.: 235,582

[22] Filed: Aug. 24, 1988

[30] Foreign Application Priority Data

Oct. 2, 1987 [CA] Canada ................................. 548474

[51] Int. Cl.⁴ ............................................. B65D 73/00
[52] U.S. Cl. ...................................... 206/461; 206/471
[58] Field of Search ............... 206/461, 462, 471, 469, 206/524, 45.24, 45.34

[56] References Cited

U.S. PATENT DOCUMENTS

| | | | |
|---|---|---|---|
| 3,093,244 | 6/1963 | Middleton, Jr. et al. | 206/461 |
| 3,289,830 | 12/1966 | Foote | 206/462 X |
| 3,402,810 | 9/1968 | Percelay | 206/461 |
| 3,599,928 | 8/1971 | Strong | 206/461 X |
| 4,322,001 | 3/1982 | Hurley | 206/45.34 X |
| 4,702,368 | 10/1987 | Jones | 206/45.24 |
| 4,702,374 | 10/1987 | Kelner | 206/471 X |
| 4,781,289 | 11/1988 | Perkins | 206/45.24 |

FOREIGN PATENT DOCUMENTS 1353019 1/1964 France ................................. 206/461

Primary Examiner—Bryon P. Gehman
Attorney, Agent, or Firm—Charles J. Zeller; Gene Warzecha

[57] ABSTRACT

The invention relates to self-supporting, vertically free-standing display packages for displaying a product. More particularly, the invention relates to a blister pack display package having a preformed product closure attached to a paperboard back and provided with a unitary support structure. Another aspect of the invention concerns its manufacture by molding a plastic sheet into said blister package in such manner as to advantageously strengthen said unitary support structure along the edge of its contact with the surface on which it stands.

19 Claims, 6 Drawing Sheets

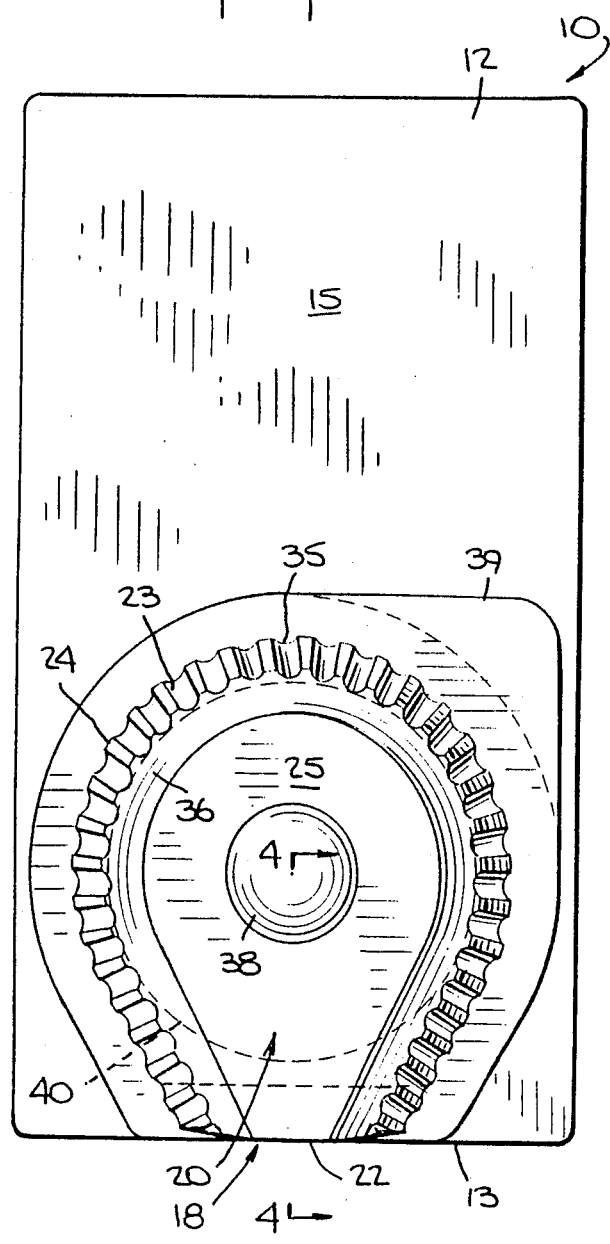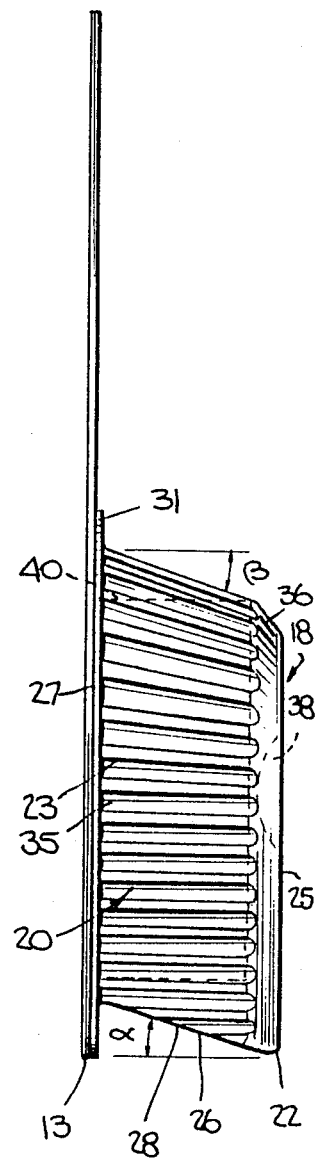

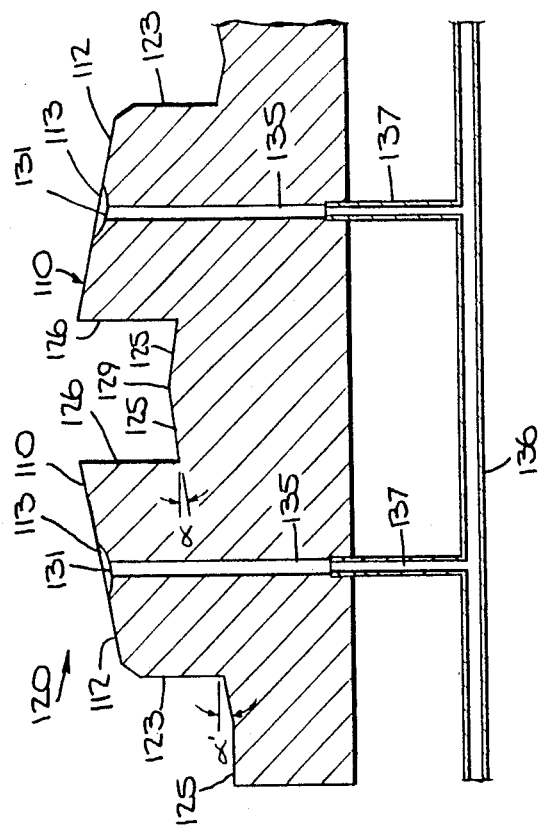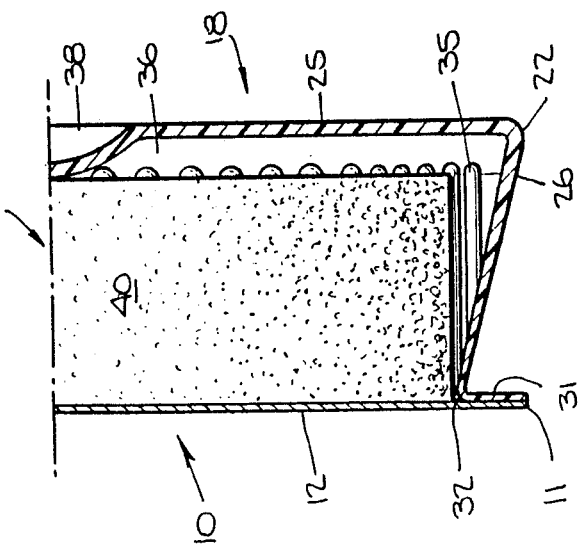

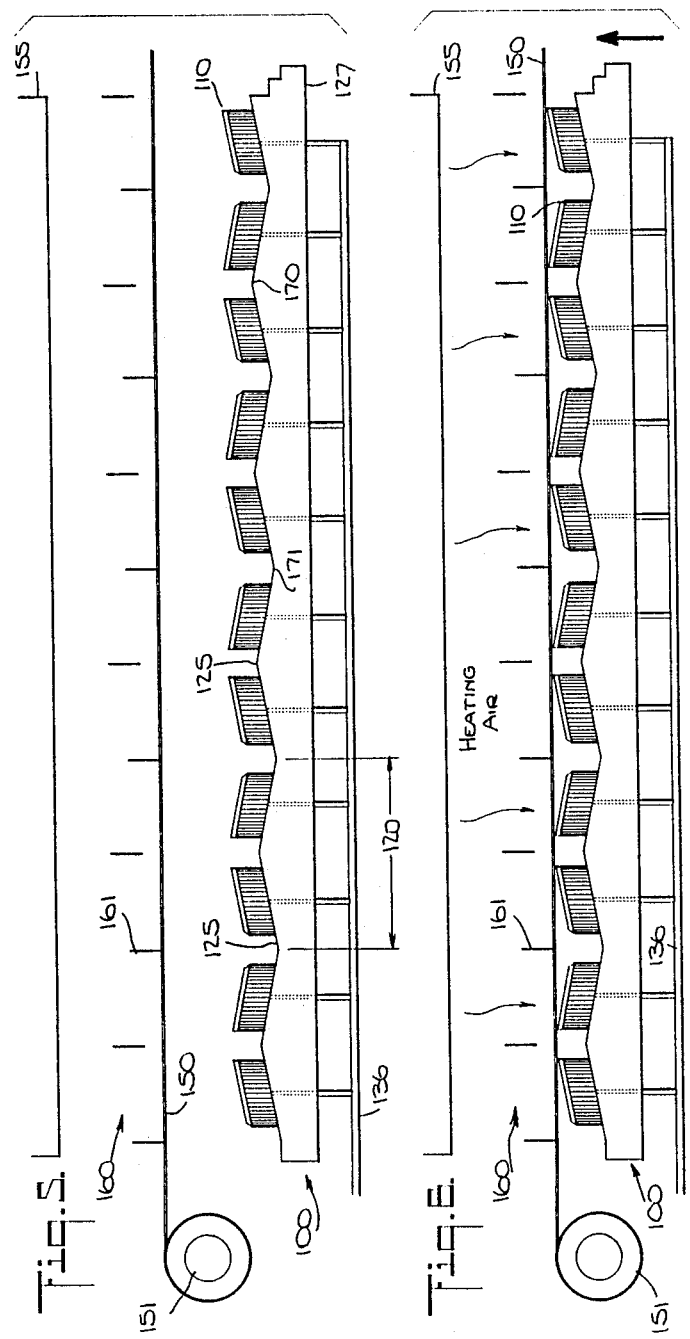

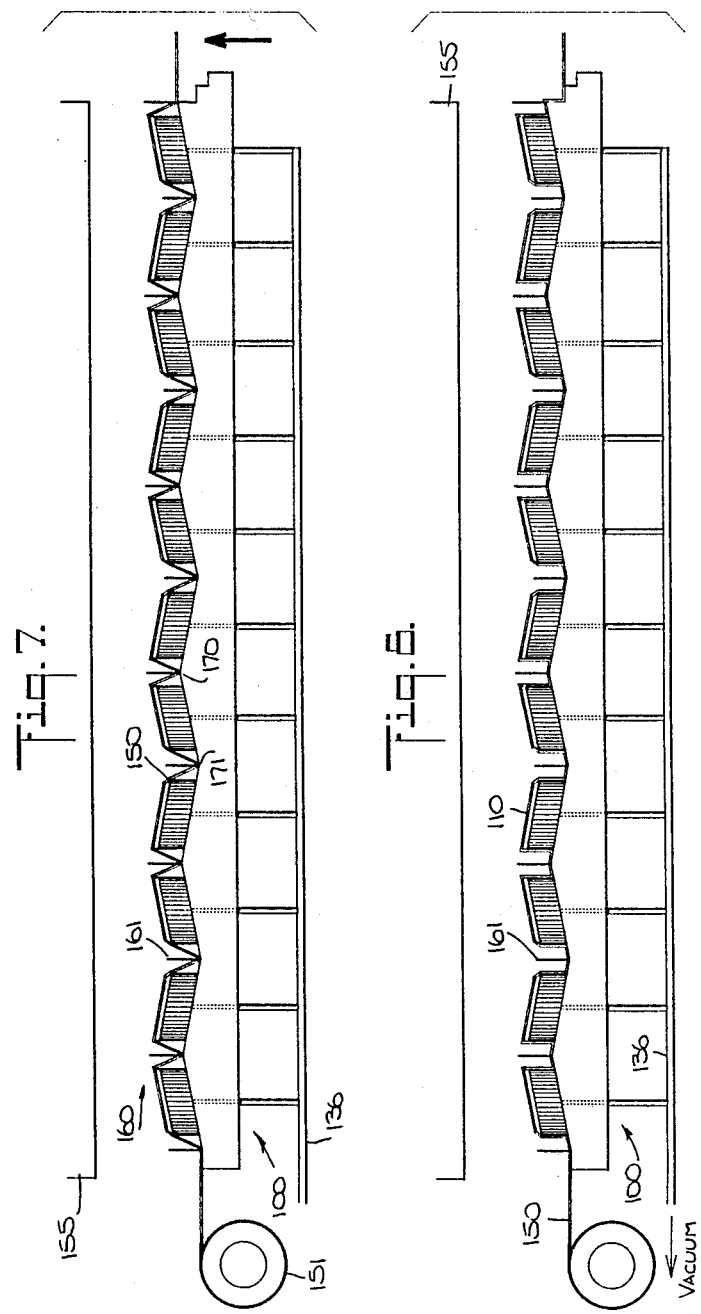

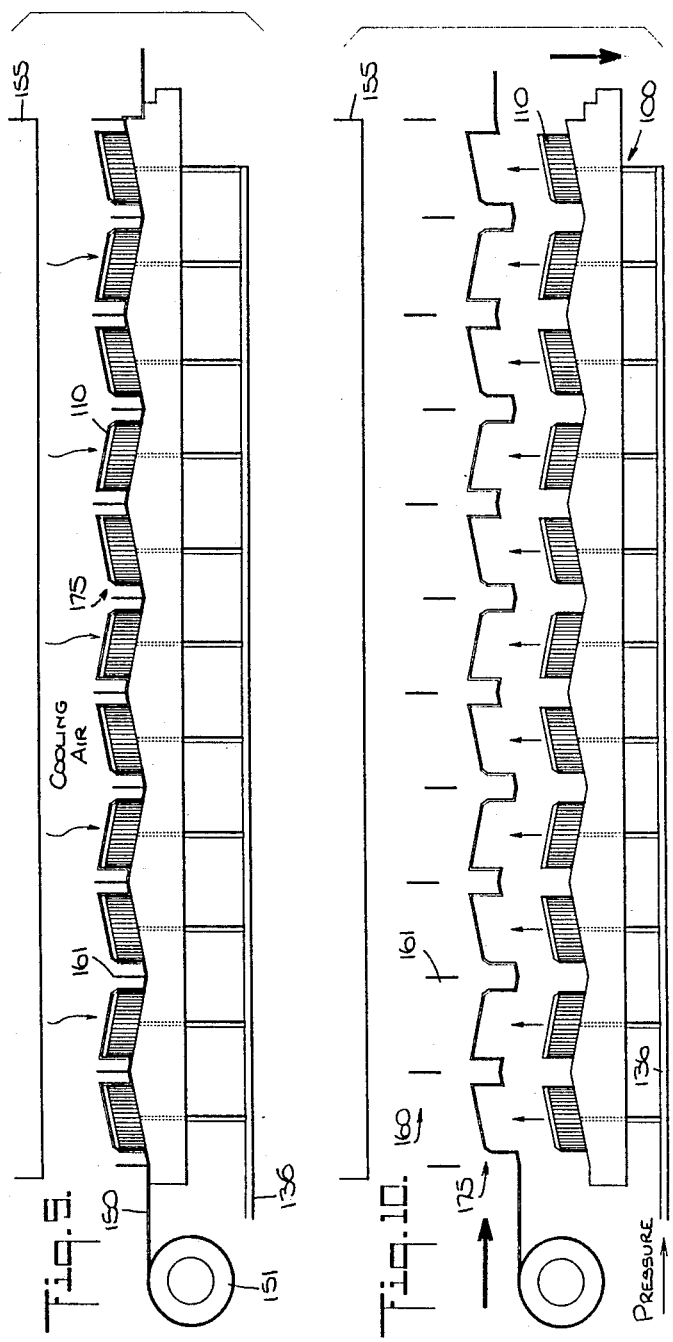

SELF-SUPPORTING DISPLAY BLISTER PACKAGE

FIELD OF THE INVENTION

The invention relates to self-supporting, vertically free-standing display packages for displaying a product. More particularly, the invention relates to a blister pack display package having a preformed product closure attached to a paperboard back and provided with a unitary support structure. Another aspect of the invention concerns its manufacture by molding a plastic sheet into said blister package in such manner as to advantageously strengthen said unitary support structure along the edge of its contact with the surface on which it stands.

BACKGROUND OF THE INVENTION

Numerous packaging concepts are known in the prior art for displaying a variety of products in many ways. The choice of packaging concept depends greatly upon the ultimate effect which is desired to be presented to the consumer. The blister package of the present invention concerns those situations wherein the blister package desirably is presented to the consumer in a plurality of independent packages, each free-standing vertically on a horizontal support surface. While in some types of packages the vertical support is provided by folded panels of paperboard, this invention pertains to packages in which the support is provided by a reinforced edge incorporated in the blister portion of the total package in cooperation with the edge of the paperboard backing member to which the blister portion is affixed.

Many prior art, vertically self-supporting blister pack display packages are provided with a supporting structure unitarily formed at the bottom of the blister. In one such prior art package, the blister comprises a vertical front wall; a C-shaped side wall; a planar bottom wall between the terminal edges of the C-shaped side wall, said bottom wall having a downward slope intersecting said front wall along a bottom, front edge, said bottom, front edge being a support edge adapted for supporting the entire package on a horizontal surface, in cooperation with the paperboard backing member bottom edge, said blister further including a marginal flange normal to the rear edge of the C-shaped side wall.

An inspection of this known article shows that the minimum thickness exists at the front surface and at the support edge and the greatest thickness exists at the marginal flange. The support edge lacks sufficient strength to withstand normal handling, and minor pressure causes the edge to collapse. Indeed, the entire forward portion of the package is weak, the forward portion receiving the most handling during manufacture and display. The known display package, in fact, attempts to resolve this lack of strength by pouring the product (a melt cast detergent bar) when in molten form directly into the enclosure of the blister, thereby allowing it to conform to the blister's shape. However, contraction of the product mass during cooling occasions an air pocket proximate the support edge, and the inherent weakness in the package remains. Moreover, the negative draft angle occasions damage of the bottom wall during removal of the newly formed blister from molds of conventional construction. Increasing the thickness of the plastic sheet to provide greater strength to the support edge would increase damage to the bottom wall during removal of the newly formed blister from molds of conventional construction.

It is an object of the present invention to provide a vertically self-supporting display package including a molded blister having an undercut.

It is also an object of the present invention to provide a self-supporting blister package including a reinforced support edge unitary with the molded blister.

It is an additional object of the present invention to provide a method for molding a blister including an undercut.

It is yet another object of the present invention to provide a method of molding a blister including an undercut and having a reinforced support edge.

It is a further object of the present invention to provide a self-supporting display package that is relatively lightweight and offers a positive, relatively rigid vertical support.

SUMMARY OF THE INVENTION

The display package of the present invention comprises a molded, plastic enclosure having a forward wall; a side wall including a side wall section that forms an acute interior angle with said forward wall, and a side wall portion opposite the side wall section that forms an obtuse interior angle with the forward wall, and an opening opposite said forward wall, said side wall section being thicker proximate the forward wall than proximate the opening, said opening being sealable by cover means having an edge, said edge cooperating with the edge formed by the forward wall and the side wall section to support the display package in an upright position.

In another aspect, the invention concerns molding plastic shapes, for example, an enclosure as described in the previous paragraph, which plastic shapes are characterized by having an acute interior angle conforming to a negative draft angle in the mold. Thus, the present invention is broadly drawn to a mold comprising an individual product mold having a first surface, a second surface adjacent thereto, and at least one third surface, at least a portion of which is opposite said second surface, said at least one third surface also being adjacent to the first surface, and a base member with which the individual product mold is integrally, preferably unitarily, constructed. The second surface, corresponding, for example, to the forward wall of the previously described display package, is angled with respect to an imaginary horizontal plane, e.g., the plane of the plastic sheet superposed above the mold during the molding process. The first and third surfaces extend or depend from a surface of the base member that is parallel to the second surface, said first and third surfaces each being substantially vertical in orientation or forming positive draft angles with respect to said horizontal plane. In a preferred embodiment, the mold is a master mold which comprises a plurality of rows of individual product mold units, each row being a mirror image of an adjacent row, two such rows forming a repeating mold segment, as hereinafter described.

In yet another aspect, the present invention concerns a process and system for molding plastic shapes with the mold previously described. In the method, a planar plastic sheet is placed above the individual product mold unit or the master mold, as the case may be, preferably softened to permit the planar plastic sheet to conform to the shape of the mold, and thereafter removed from the mold unit or master mold. Preferably air transport means allows a vacuum to be drawn and a back pressure provided to assist in the shaping and removal, respectively, of the plastic sheet from the mold.

BRIEF DESCRIPTION OF THE DRAWINGS

FIG. 2 is a front elevational view of FIG. 1, the package containing a representative product.

FIG. 3 is a left-side elevational view of FIG. 1, the package containing a representative product.

FIG. 4 is an enlarged sectional view of the device of FIG. 2 along lines 4—4.

FIGS. 5–10 are schematic diagrams of the molding operation When using a male mold.

FIG. 11 shows in vertical cross-section a single repeating mold segment 120 of the mold segment shown schematically in FIG. 5.

DESCRIPTION OF THE PREFERRED EMBODIMENT

Figure 1:
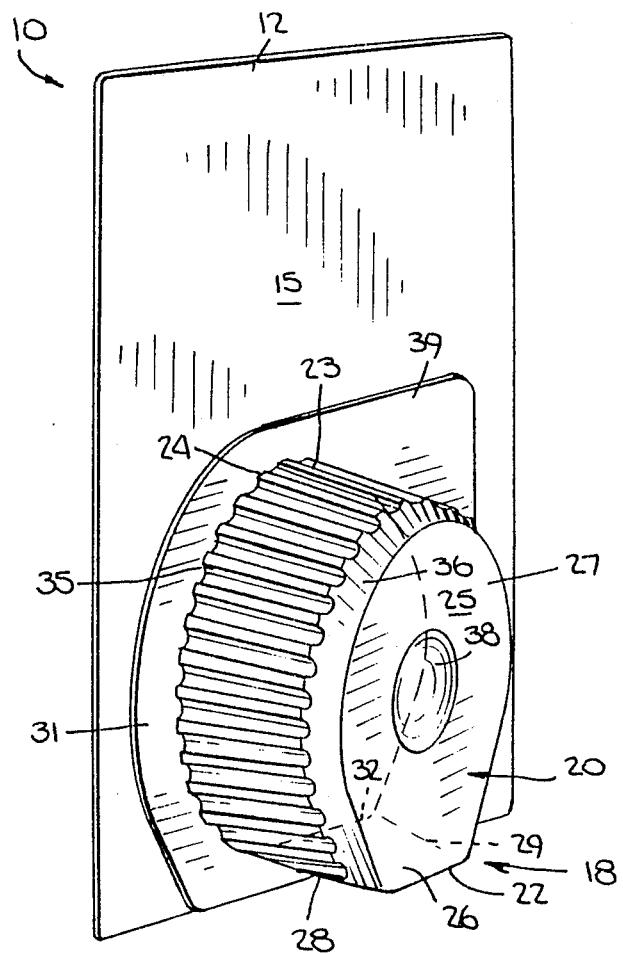
FIG. 1 shows a front perspective view of the display package of the present invention, the package not containing a product.

Referring to FIGS. 1–3, there is shown a blister package 10 embodying the principles of this invention. Package 10 is produced from a single planar substrate, here shown as a paperboard blank 12 having a front display surface 15 and a blister pack structure or blister 18 adhesively or otherwise secured to display surface 15. Blister 18 is a formed structure having a product enclosure 20 and a support structure 22 which is a reinforced support edge. The body of product enclosure 20 extends outwardly from the paperboard blank 12 in a generally horizontal direction and is formed of a C-shaped (or horseshoe-shaped) side wall 23; a closed forward (or front) wall 25, the enclosure opposite wall 25 being an open back area 27 which is covered by the paperboard blank 12; a bottom wall 26 between the terminal edges 28, 29 of the C-shaped side wall 23, and a marginal flange 31 normal to rear edge 24 of the C-shaped side wall 23. The C-shaped side wall 23 slopes outwardly from forward wall 25 to rear edge 24. Conversely, the bottom wall 26 slopes upwardly from forward wall 25 to rear edge 32 of the bottom wall 26 thereby forming with forward wall 25 an acute angle. Accordingly, the C-shaped side wall 23 forms a positive draft angle, while the bottom wall 26 forms a negative draft angle. Preferably, the negative angle draft associated with bottom wall 26 (angle $\alpha$ of FIG. 3) is equal to the positive angle draft associated with C-shaped side wall 23 (angle $\beta$ of FIG. 3). The angle $\alpha$ is generally less than about 25°, i.e., the acute angle formed within the enclosure 20 by walls 25 and 26 is greater than about 65°. Preferably, the angle $\alpha$ is between about 5° to aobut 20° (i.e. an acute interior angle of from about 70° to about 85°), and most preferably $\alpha$ is between about 75° to about 85° (an acute interior angle of from about 5° to about 15°).

As most clearly shown in FIG. 3, the bottom edge 13 of paperboard blank 12 lies substantially on the same horizontal plane as reinforced support edge 22, the reinforced support edge 22 being formed by the intersection of the forward wall 25 and the bottom wall 26.

Preferably, C-shaped side wall 23 includes a plurality of flutes 35 extending from edge 28 to edge 29. In addition, it is preferred that a chamfer 36 be included between the C-shaped side wall 23 and the forward wall 25, to facilitate removal from the mold and to provide additional strength to the blister. The display package 10 is intended to hold, for example, a tableted or extruded article such as a cylindrical toilet bowl cleaner disc 40 which, because of the construction of blister 18 and the relative sizes of product enclosure 20 and the product, may rest near the bottom wall 26, but which does not fill the enclosure 20. Recess 38 is provided to prevent the product 40 within the product enclosure 20 from moving. The oversized portion 39 of flange 31 is provided to allow removal of the blister from the display surface 15, the portion of the oversized area 39 not being affixed to the display surface 15.

Referring to FIG. 4, it is seen that the thickness of blister 18 is greatest proximate the forward wall 25, and decreases generally in the direction of the flange 31. Accordingly, the support edge 22 has great strength, and the package 10 may be used in connection with a product of substantial weight. The flange 31 is seen to be thinner than the forward wall 25. Accordingly, deformation on cooling of the blister following molding is minimized, thereby ensuring a suitable seal to the display surface 15.

Although in the preferred embodiment, product enclosure 20 is cup-shaped with a frusto-conical side wall 23, it will be understood that many shapes may be suitable for a product enclosure, and the term "cup-shaped" as used herein to describe the C-shaped wall 23 is intended to mean an enclosure which is closed or covered on all sides except the side covered by the paperboard blank 12 or some other similar covering. The flange 31 should be a predetermined minimal width to accommodate conventional heat-sealing equipment which must fit in the area between edge 13 of the paperboard blank 12 and the edge 32 of the bottom wall 26. While in the preferred embodiment, the product closure is totally sealed by having its opening 27 covered by paperboard blank 12, it will be understood that certain products may not need to be totally sealed. It is seen that the display package 10 provides the product enclosure 20 proximate to the bottom edge 11, thereby providing the assembled package containing the product a low center of gravity. As indicated in FIG. 2 by the outline of a typical product 40, it is not necessary for the product to conform to the shape of the blister package, nor is it necessary that the product conform to the shape of the lowermost portion thereof.

Reference is now made to FIGS. 5 and 11. From FIG. 5 it is seen that the master mold 100 may comprise a plurality of individual blister product mold units 110. Preferably, two adjacent blister mold units 110 comprise a single repeating mold segment 120. It is understood that the master mold 100 may further comprise a plurality of rows of individual product mold units 110, which rows would be disposed perpendicular to the mold segment 120 shown in FIGS. 5 and 11, thereby forming a matrix of individual product mold units 110.

FIG. 11 shows a single repeating mold segment 120 that comprises two individual product units 110 in male orientation; oppositely opposed, sloping base member segments 125 supporting said individual product mold units 110, the plurality of the base member segments 125 forming the base structure 127 for the master mold 100, and air transport means comprising conduits 135 drilled through the base member segments 125 and commonly connected at one end to header 136, the other ends forming apertures 131 in the top walls 112 of the individual product mold units 110. Preferably, the apertures 131 are within the recesses 113 that correspond to the recess 38 of the blister 18.

The master mold 100 may be made from any convenient material conventionally employed in the molding art. Preferably, the molds are made of aluminum or other suitable metal, or cast epoxy resin.

As seen from FIG. 11, the side wall 126 corresponding to the bottom wall 26 of the blister 18 and the side wall 123 corresponding to the C-shaped side wall 23 of blister 18 are each vertical relative to horizontal, while planar base members 125 are sloped in an amount equal to the draft associated with the side wall 23 and the bottom wall 26 of the blister 18. Accordingly, the angles $\alpha'$ shown in FIG. 11 are equal to the angle $\alpha$ and the angle $\beta$ shown in FIG. 3. By such construction, the molded blisters 18 are vertically withdrawn from the individual product mold units 110.

Reference is now made to FIGS. 5-10 illustrating the sequence of the molding operation. In FIG. 5 a sheet of thermoformable plastic 150 has been unwound from roll 151 and is in position above the master mold 100, and below a source of heated air 155, which may comprise a fan or blower and a heating element. The plastic sheet 150 is positioned adjacently beneath device 160, which comprises a plurality of parallel wire filaments 161 that are in alignment with the alternating crests 170 and depressions 171 formed by the planar base member segments 125. Air transport lines 135 are connected to headers 136 via conduits 137. The conduits may be connected to the lines 135 by a conventional tap connection. In this embodiment the header 136 is connected to the air and vacuum lines by a hose connection (not shown), which permits movement of the master mold 100 as well as the air transport means. Alternately, each of the conduits 137 may be a flexible hose, in which case the header 136 may be stationary.

In FIG. 6 the master mold 100 has been raised to meet the plastic sheet 150 backed by the wire filaments 161, the plastic sheet having been softened by the application of heat from heat source 155. As shown in FIG. 7, the plastic sheet has begun to take the shape of the individual product mold units 110 and the wire filaments 161 have pinned the plastic sheet to the planar base member segments 125 at crests 170 and depressions 171. In FIG. 7 the master mold 100 is at its maximum upward travel, and the application of heat has ceased. Thereafter, as shown in FIG. 8, vacuum is drawn through each of the conduits 135, whereby the softened plastic is further urged to take the configuration of the individual product mold units 110. Even though the aperture 131 in the top 112 of the individual product mold units is centrally located, the plastic is softened sufficiently that air contained between the sheet 150 and the surface of the master mold 100 is withdrawn. Following cessation of vacuum, cooling air is forced downwardly onto the plastic sheet, and a molded matrix 175 of blisters 18 is hardened, as shown in FIG. 9. Cooling air may be provided from fan 155, with its heating element off. Alternately, a separate unit may be provided, which unit is slidable on tracks and positionable above the master mold 100. The master mold 100 is then lowered, and the molded matrix 175 of blisters 18 is removed from the master mold 100, with the assistance of pressurized air provided through the conduits 131, as shown in FIG. 10. The molded matrix 175 of blisters 18 is removed from above the master mold 100, thereby placing a new plastic sheet 150 into position, and the molded matrix of blisters 18 is then severed from the roll. The blisters 18 are then separated and trimmed.

The invention is further illustrated by the example below.

EXAMPLE 1

A plastic sheet was positioned above a master mold such as illustrated in FIGS. 5 and 11 such that the wire mesh was superposed above the sheet. The sheet was softened until a slight sag was observed by warm air from an overhead blower equipped with a heating coil. The master mold was then raised to meet the plastic sheet, the softened plastic conforming to the shape of each individual product mold unit. With the wire filaments 161 in contact with the base of the mold, thereby segregating each row of individual product mold units, a vacuum of about 25 in. Hg was pulled, the plastic being drawn thereby into intimate contact with the surface of the mold. Cooling air was next directed onto the surface of the shaped plastic sheet, rigidifying same, and thereafter a back pressure of 100 psig was provided to the under surface of the shaped plastic sheet in contact with the mold. Essentially simultaneously, the master mold was lowered, and the shaped plastic sheet released. The shaped plastic sheet was removed from above the mold and cut into individual blister units.

EXAMPLE 2

Figure 12:
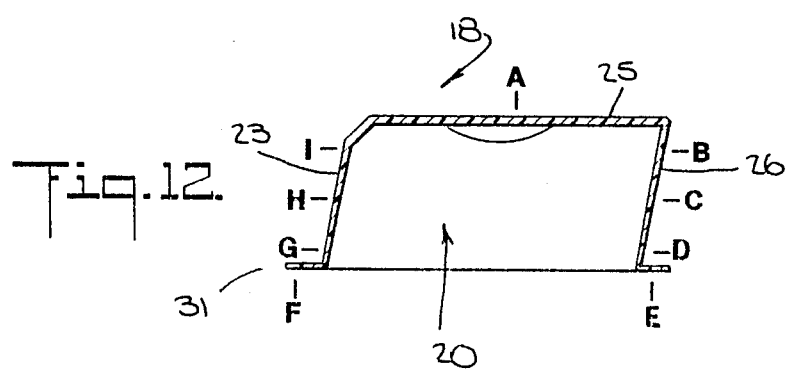
FIG. 12 is a half-sectional view of the device of FIG. 2, identifying points of thickness measurement in connection with Example 2.

Five blisters (Units 1-5) made generally in conformance with the procedure of Example 1 were examined. Referring to FIG. 12, thickness measurements were made at points A-I, as recorded below.

TABLE I

| Point | Thickness (mils) | | | | |
|---|---|---|---|---|---|
| | Unit 1 | Unit 2 | Unit 3 | Unit 4 | Unit 5 |
| A | 10 | 10 | 10 | 10 | 10 |
| B | 7 | 8 | 8 | 6 | 5 |
| C | 5 | 5 | 5 | 5 | 5 |
| D | 4 | 3 | 4 | 3 | 4 |
| E | 4 | 4 | 5 | 5 | 4 |
| F | 6 | 5 | 7 | 7 | 5 |
| G | 5 | 3 | 6 | 5 | 3 |
| H | 6 | 3 | 7 | 4 | 5 |
| I | 8 | 8 | 9 | 9 | 8 |

It is seen that the forward wall 25 retains the original thickness of the plastic sheet—10 mil, and that the side wall 23 and the bottom wall 26 proximate forward wall 25 (Points B and I) are substantially thicker than proximate the flange 31 (Points D and G). Indeed, thickness of the flange 31 (Points E and F) is about half that of the forward wall 25 (Point A), and is amenable to sealing to a paperboard blank. It is further seen that the major portions of the side wall 23 and the bottom wall 26 are about half as thick as the forward wall 25, whereby removal of the molded sheet from the mold is facilitated. On the other hand, the thickness of the minor portions of the side wall 23 and bottom wall 26 proximate the forward wall 25 is retained as compared to the aforesaid major portions. Accordingly, the blister package is strongest proximate the forward wall where the greatest amount of contact occurs during shipping, display, and by consumer handling.

I claim:

1. A self-supporting display package comprising:
   a molded, cup-shaped plastic product enclosure having a generally vertical forward wall, a side wall including a bottom side wall section forming with said forward wall an edge having an acute interior angle with the interior of said forward wall, and an opening, said enclosure extending in one generally horizontal direction from said opening, and the portion of the side wall opposite said bottom side wall section forming an obtuse interior angle with the interior of said forward wall, said side wall being thicker proximate said forward wall than proximate said opening, and means for covering said opening to retain a product within said enclosure, said opening covering means having a bottom in substantially the same plane as said edge, said edge cooperating with said bottom of said opening covering means to support the display package in an upright position.

2. The display package of claim 1, wherein the means for covering the opening is a planar substrate.

3. The display package of claim 2, wherein the substrate is a paperboard blank.

4. The display package of claim 1 or 2, wherein the portion of the side wall opposite said bottom side wall section is substantially parallel to said bottom side wall section.

5. A self-supporting display package comprising:
a molded, cup-shaped plastic product enclosure having a generally vertical forward wall, a substantially C-shaped side wall, a bottom side wall formed between the terminal ends of said C-shaped side wall, and an opening aligned in a generally vertical plane, said enclosure extending in a generally horizontal direction from said vertical plane, said bottom side wall being acutely angled relative said forward wall and forming with said forward wall a support edge, the portion of said C-shaped side wall opposite said bottom side wall forming an obtuse angle with said forward wall and the thickness of said bottom side wall proximate said forward wall being greater than the thickness of said bottom side wall proximate said opening, and
a planar substrate for covering said opening to retain a product within said enclosure, said planar substrate having an edge in substantially the same plane as said support edge, said edge of said substrate cooperating with said support edge to support the display package in an upright position.

6. The display package of claim 5 further comprising a peripheral flange unitary with said product enclosure adjacent said opening, the flange being affixed to said substrate.

7. The display package of claim 6, wherein the flange includes an oversized portion, which portion is not adhesively attached to the substrate.

8. The display package of claim 5, wherein the acute angle formed between the bottom wall and the forward wall is greater than about 65°.

9. The display package of claim 8, wherein the portion of the side wall opposite said bottom wall is substantially parallel to said bottom wall.

10. The display package of claim 1, 5, or 9 further comprising an article of manufacture contained therein.

11. The display package of claim 1, 5, or 9 further comprising an article of manufacture contained therein, said article being a disk-shaped detergent bar.

12. The display package of claim 8 or 9, wherein the acute angle formed between the bottom wall and the forward wall is between about 70° and 85°.

13. The display package of claim 5 or 9, wherein the C-shaped side wall is substantially frusto-conical.

14. The display package of claim 13, wherein the acute angle formed between the bottom wall and the forward wall is between 75° and 85°.

15. The display package of claim 5 or 9, wherein the edge of the substrate and the support edge are in substantially the same plane.

16. The display package of claim 5, wherein the substrate is a paperboard blank.

17. The display package of claim 5, wherein the forward wall is chamfered.

18. The display package of claim 5, wherein the forward wall includes a dimple recess.

19. The display package of claim 5, wherein the C-shaped side wall is fluted.

* * * * *